(12) United States Patent
Belleguie (10) Patent No.: US 7,035,295 B2
(45) Date of Patent: Apr. 25, 2006

(54) DIRECT RTP DELIVERY METHOD AND SYSTEM OVER MPEG NETWORK

(75) Inventor: Loys Belleguie, Yokohama (JP)

(73) Assignee: Koninklijke Philips Electronics N.V., Eindhoven (NL)

( * ) Notice: Subject to any disclaimer, the term of this patent is extended or adjusted under 35 U.S.C. 154(b) by 756 days.

(21) Appl. No.: 10/198,498

(22) Filed: Jul. 18, 2002

(65) Prior Publication Data

US 2003/0046431 A1     Mar. 6, 2003

(30) Foreign Application Priority Data

Jul. 23, 2001     (JP)     ............................ 2001-222111

(51) Int. Cl.
H04J 3/24     (2006.01)
H04J 3/02     (2006.01)

(52) U.S. Cl. ...................................... 370/537; 370/474

(58) Field of Classification Search ..................... None
See application file for complete search history.

(56) References Cited

U.S. PATENT DOCUMENTS

| | | | |
|---|---|---|---|
| 6,181,713 B1* | 1/2001 | Patki et al. .................. | 370/474 |
| 2003/0162495 A1* | 8/2003 | Yonemoto et al. ............. | 455/7 |
| 2004/0008739 A1* | 1/2004 | Aoki .......................... | 370/537 |
| 2004/0064504 A1* | 4/2004 | Domschitz .................. | 709/203 |
| 2005/0034156 A1* | 2/2005 | Terui .......................... | 725/40 |

OTHER PUBLICATIONS

Belleguie et al: "An innovative solution for achieving media convergence using RTP streaming in ARIB framework" Journal Of The Institute Of Image Information And Television Engineers, vol. 56, No. 2, Feb. 2002, pp. 218-225.

* cited by examiner

*Primary Examiner*—Duc Ho (57) ABSTRACT

A system 7 for transmitting a target stream 7r compliant with the Real Time Protocol or its equivalent. The target stream 7r has time stamps according to its content and other fields including a sequence number. The system 7 comprises:—means for receiving the target stream 7r from at least one source and a broadcasting stream (7ae, 7ve) from a broadcasting network, the broadcasting stream being compliant with MPEG-2 standard or its equivalent;—means (72,74, 76,78) for packetizing or sectionalizing the broadcasting stream (7ae, 7ve) to form a packetized elementary stream (7ap, 7vp);—means (7A) for encapsulating the target stream 7r in a modified form of a stream of DSM-CC sections of MPEG-2 standard; and—means 7M for multiplexing the stream of DSM-CC sections and the packetized elementary stream to form a transport stream TM compliant with MPEG-2 or its equivalent, the transport stream including transport stream packets into which the stream of DSM-CC sections and packetized elementary stream are divided and encapsulated, the transport stream packets each including a packet identifier for itself.

8 Claims, 9 Drawing Sheets

| DSMCC_section() { |
|---|
| table_id |
| section_syntax_indicator |
| private_indicator |
| reserved |
| dsmcc_section_length |
| table_id_extension |
| reserved |
| version_number |
| current_next_indicator |
| section_number |
| last_section_number |
| if (table_id == 0x3B) { userNetworkMessage() } |
| else if (table_id == 0x3C) { downloadDataMessage() } |
| else if (table_id == 0x3D) { DSMCC_descriptor_list() } |
| else if (table_id == 0x3E) { private_data_byte } |
| else if (table_id == 0x3F) { RAW_RTP_Packet() } |

FIG.6

| Fields | Number of bits | | value | note |
|---|---|---|---|---|
| dsmcc_section_length | 12 | RTP/RTCP | RTP packet size + 5 bytes (+ 4 CRC) | Mandatory for client side parser |
| table_id_extension | 16 | RTP | 2 LSB RTP timestamp | Used for client side buffering of frame (same time stamp but different sequence number). Timestamp are not monotonic when received by the receiver, especially for video, since the I or P frames arrive ahead of time. |
| | | RTCP | | not defined |
| reserved | 2 | | | |
| version_number | 5 | RTP | 5 (least significant) bits of RTP packet sequence number difference | This should be used as an indicator of packet loss when this field is not equal to unity. Contrary to timestamp, sequence number is monotonic and a difference would indicate a failure somewhere in the broadcasting chain. |
| | | RTCP | | not defined |
| current_next_indicator | 1 | RTP | 0 | Differentiate RTP and RTCP messages |
| | | RTCP | 1 | |
| section_number | 8 | RTP | number of packets belonging to this timestamp | Indicates whether a packet was lost in the group or to determine the required buffer size |
| | | RTCP | | not defined |
| last_section_number | 8 | RTP/RTCP | payload type (PT) | In case of RTP, provides information on media type. In case of RTCP, indicates the type of report, SR, BYE.. |

FIG.7

| Control message type | Note |
|---|---|
| SR | Sender Reports are multiplexed with the RTP data delivery on the same channel (same PID). The client will parse or toss those packets. |
| RR | Receiver Reports are not expected from clients in a pure broadcasting environment. In case where clients are also connected to a return channel (for example via the Internet), the RR message shall be delivered to the server using the RTP protocol specification. RR meaning is anyhow questionable in the present context, where bandwidth is fixed and guaranteed. The receiver device should emit two separate channels of RTCP with a recognised CNAME associated with the broadcast or the TCP/IP path. |
| SDES | CNAME is mandatory and kept to specify the broadcasting source. |
| BYE | BYE message is mapped to a DSMCC event message. |
| APP | customised RTP/DSM streaming |

DIRECT RTP DELIVERY METHOD AND SYSTEM OVER MPEG NETWORK

The invention relates to a method and a system for transmitting and/or receiving RTP (Real Time Protocol) based data using a broadcasting network system that is standardized by MPEG-2.

The RTP protocol is mainly used in the Internet. The RTP based delivery of audio/video content is now becoming very popular in the Internet arena. It is used as the standard real time-based packetization-method in many environments and sits just above transport layers in a protocol stack, such as UDP(User Datagram Protocol)/IP(Internet Protocol). The RTP is associated with RTCP (Real Time Control Protocol) to add control and feedback capabilities to its delivery mechanism. An application-level protocol, RTSP, which stands for Real Time Session Protocol, has been also developed to offer session negotiation and content description mechanism.

On the other hand, an MPEG-2 system is mainly dedicated to high quality transmission of MPEG-2 audio and/or video stream in a broadcasting network. In addition, as a technique of delivering the Internet contents in MPEG-2 system, there is a method defined by DVB (Digital Video Broadcasting) and ATSC (United States Advanced Television System Committee) consortia. This method is directed to a system that delivers the Internet contents over the MPEG-2 broadcasting system in a specific format based on both of the Internet-specific protocols (IP/TCP (Transmission Control Protocol), UDP, etc.) and MPEG-2 DSM-CC (Digital Storage Media Command and Control) addressable sections protocol. This method is very generic and can be used quite inefficiently to transmit RTP packets carried by UDP/IP packets. However, to the knowledge of the inventor, no such attempt have been made public yet.

To our knowledge, the only attempt to develop a standard for Internet Protocol delivery over digital broadcasting networks has been initially within the DVB framework in Europe (Broadcasting system) and recently with ATSC (TV program provider). Both proposals are at the same time quite complicated and too generic. They rely on the addressable sections and the concept of tunneling Internet Protocol datagrams in the most generic way. This strategy adds overhead and complication while the only relevant information for the set-top box is contained in the RTP packets. Moreover, propagating unnecessary network information in the broadcast path makes no sense from an application point of view, and only complicates the picture. Indeed, in the near future many digital receivers will be mobile devices, such as PDAs, car navigation systems, hybrid mobile phones, in addition to standard set-top boxes. They will be able to hook to the terrestrial digital broadcasting network for receiving RTP based programs with high quality of service from local radio stations or small size video content providers, or switch to the Internet to receive the same streaming content. The main characteristic of these applications will be to act as "stream sinks" where only the RTP payload matters.

In view of such circumstances and prediction, the inventor has found that the RTP data can be directly transmitted over the MPEG-2 system, without using its underlying protocol stack such as UDP/IP.

It is an object of the invention to provide a method and a system for transmitting and/or receiving RTP based data without the Internet-specific protocols by using a broadcasting network system that is standardized by MPEG-2 or its equivalent.

It is another object of the invention to provide a method and a system for distributing the same content of RTP data over both of a broadcasting network and the Internet, with saving cost and with reducing complexity.

In order to achieve the object, one aspect of the present invention is a method of transmitting a target stream compliant with the Real Time Protocol, the target stream having time stamps according to its content, the method comprising the steps of:

receiving the target stream from at least one source and receiving a broadcasting stream from a broadcasting network, the broadcasting stream being compliant with the MPEG-2 standard;

packetizing or sectionalizing the broadcasting stream to form a compliant MPEG-2 Systems stream;

encapsulating the target stream in a stream of DSM-CC sections; and multiplexing the stream of DSM-CC sections and the compliant MPEG-2 Systems stream to form a transport stream compliant with MPEG-2, the transport stream including transport stream packets into which the stream of DSM-CC sections and compliant MPEG-2 Systems stream are divided and encapsulated, the transport stream packets each including a packet identifier for itself.

This method may be characterized in that the method further comprises the step of transmitting the transport stream to end user's terminals in the broadcasting network.

The method may be characterized in that the target stream is an RTP stream originated in the Internet.

The method may be characterized in that the RTP stream is for representing audio or video.

The method may be characterized in that the broadcasting stream includes a stream for representing audio or video for broadcasting.

In order to achieve the object, another aspect of the present invention is a method of receiving a signal including the transport stream formed by the transmission method, the method comprising the steps of:

receiving the signal and deriving the transport stream;

demultiplexing the transport stream to derive transport stream packets of the compliant MPEG-2 Systems stream and the stream of DSM-CC sections, using the packet identifiers for the streams;

combining the transport stream packets into the compliant MPEG-2 Systems stream and the stream of DSM-CC sections;

decoding the compliant MPEG-2 Systems stream into the broadcasting stream; and decoding the stream of DSM-CC sections into the target stream.

In order to achieve the object, the other one aspect of the present invention is a system for transmitting a target stream compliant with the Real Time Protocol, the target stream having time stamps according to its content, the system comprising:

means for receiving the target stream from at least one source and for receiving a broadcasting stream from a broadcasting network, the broadcasting stream being compliant with the MPEG-2 standard;

means for packetizing or sectionalizing the broadcasting stream to form a compliant MPEG-2 Systems stream;

encapsulating the target stream in a stream of DSM-CC sections; and means for multiplexing the stream of DSM-CC sections and the compliant MPEG-2 Systems stream to form a transport stream compliant with MPEG-2, the transport stream including transport stream packets into which the stream of DSM-CC sections and compliant MPEG-2 Systems stream are divided and encapsulated, the transport stream packets each including a packet identifier for itself.

In order to achieve the object, further aspect of the present invention is a system for receiving a signal including the transport stream formed by the transmission system, the system comprising:

means for receiving the signal and deriving the transport stream;

means for demultiplexing the transport stream to derive transport stream packets of the compliant MPEG-2 Systems stream and the stream of DSM-CC sections, using the packet identifiers for the streams;

means for combining the transport stream packets into the compliant MPEG-2 Systems stream and the stream of DSM-CC sections;

means for decoding the compliant MPEG-2 Systems stream into the broadcasting stream; and means for decoding the stream of DSM-CC sections into the target stream.

According to these aspects, it is possible to transmit streaming contents carried in RTP packets, seamlessly over both the Internet and Broadcasting networks, thus achieving interoperability and media convergence. Furthermore, since the RTP packets can be decoded rather directly at the receiver side, less expensive and simpler hardware and software can be achieved.

The above-mentioned aspects and other aspects of the invention will be described in more detail.

Figure 1:
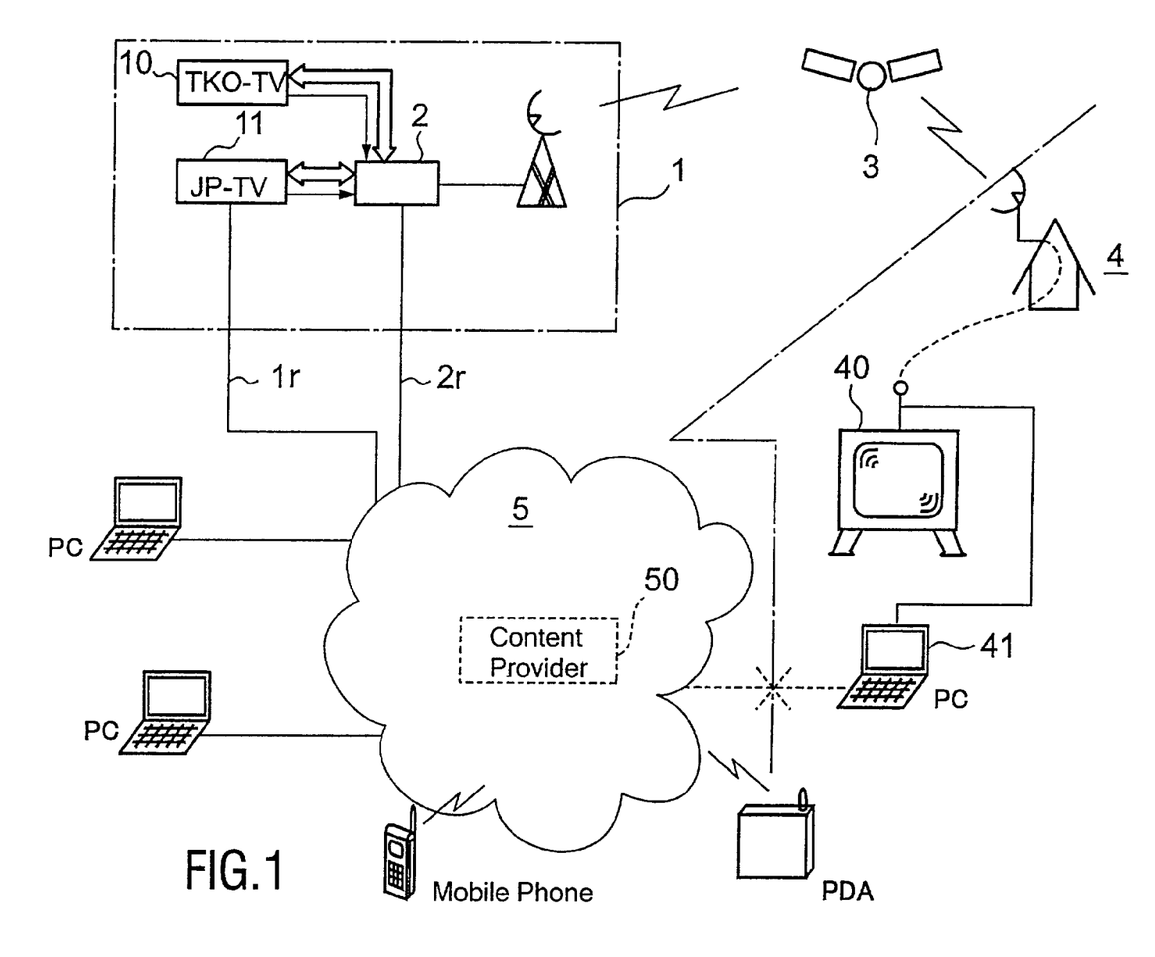
FIG. 1 is a overview of a system according to an embodiment of the invention.

FIG. 1 is an overview of a system according to one embodiment of the present invention. In FIG. 1, TV-program providers 10, 11 in a broadcasting system 1 such as BS-Digital provide television program information streams to a satellite digital broadcasting station 2. The station 2 combines the streams to form an MPEG-2 stream. The MPEG-2 stream is transmitted via a broadcasting satellite 3 to consumer's TV set 40 or personal computer 41 capable of receiving the MPEG-2 stream. RTP streams 1r, 2r, e.g., originated from the Internet content provider 50 are led out from the Internet 5 and delivered to the TV-program provider 11 and the broadcasting station 2. Here, the delivery of the RTP stream from the Internet 5 to the broadcasting system 1 is based on UDP/IP (specifically mentioned later). However, any other means of delivery, such as file, could be used as well. In the TV-program provider 11 and the broadcasting station 2, the RTP stream is extracted and added to the MPEG-2 stream in a manner of the present invention, namely, based directly on RTP without UDP/IP.

Thus the resultant MPEG-2 stream includes a raw RTP stream that is not ornamented with UDP/IP and is transmitted to the broadcasting network. Hereinafter, we will refer to such transmission of raw RTP data without UDP/IP refers as "direct RTP delivery".

The same content of the RTP streams 1r, 2r can be made available on not only the Internet 5 but also the broadcasting network, thereby providing an increased interoperability between networks and promoted ubiquity of the contents from the provider 50. By virtue of the direct RTP delivery, the whole system also acquires another advantage as described later.

Now, the protocol architecture for implementing the direct RTP delivery is described with reference to FIG. 2.

Figure 2:
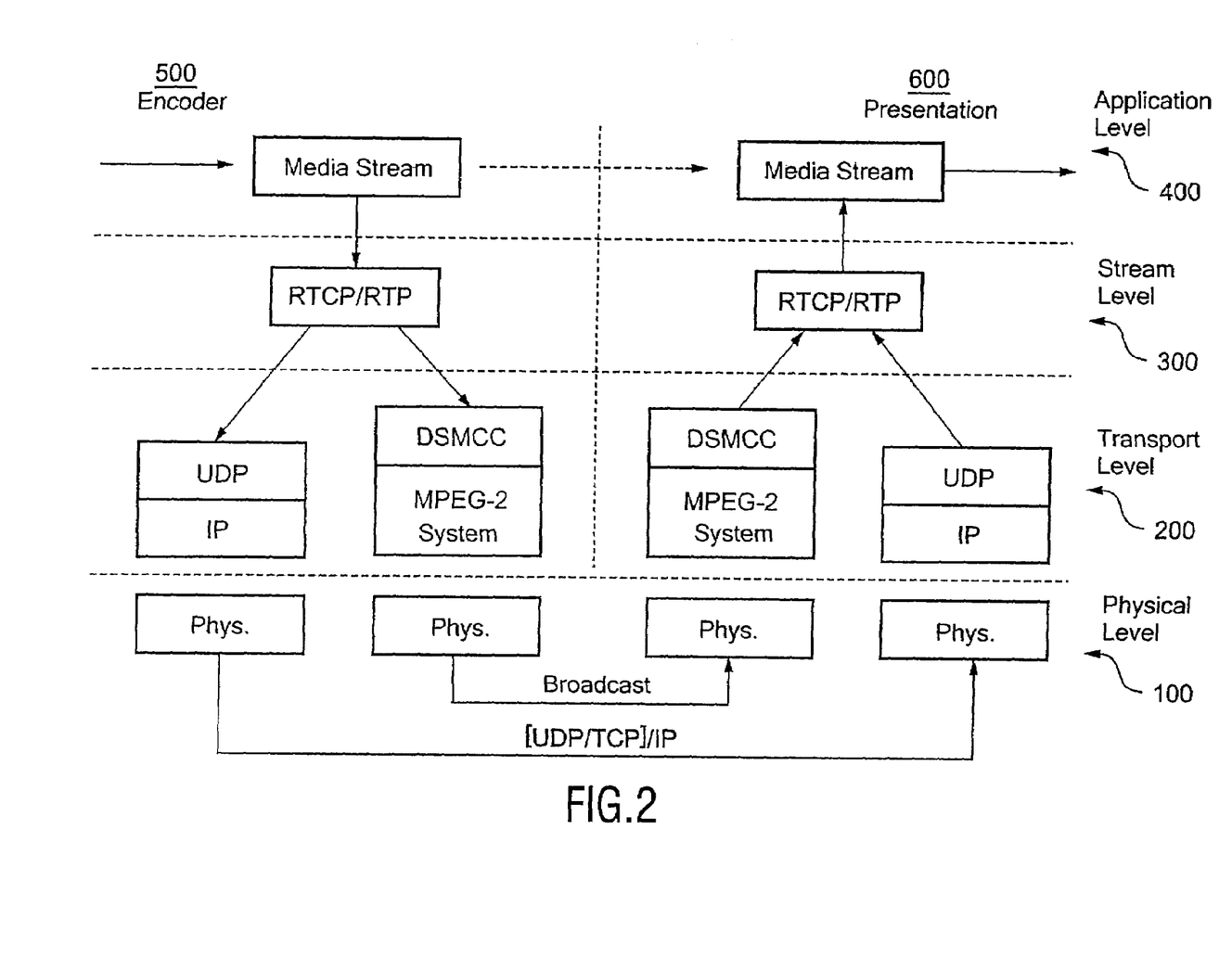
FIG. 2 is a schematic diagram showing a protocol layer architecture.

As shown in FIG. 2, the protocol architecture comprises generally 4 layers of physical level 100, transport level 200, stream level 300 and application level 400. The protocol layer architecture is designed in such a way as to make the distinction between the stream layer 300 and the transport layer 200 truly apparent. Considering a path form the producer/broadcaster side (encoder) 500 to the consumer side (receiver or presentation device) 600, the RTP packets constituting the RTP stream may be encapsulated in DSM-CC sections, without any information of transport layer relating to the Internet, such as a port number or IP address defined in either UDP or IP, and the resultant RTP data in form of direct RTP delivery may be sent over the broadcast channel.

The RTCP packets are encapsulated using the same method. On the receiver side, the multimedia presentation should be handled at the RTP level independently directly out from the transport protocol like UDP or DSM-CC.

With reference to FIG. 2, the media stream coming out from the encoder is packetized using an RTP format, and RTSP sender reports messages can be generated. This packetized stream is then either inserted in UDP packets or encapsulated in DSM-CC sections. UDP packets are usually sent over an IP protocol network, for example the Internet 5 or a Local Area Network (LAN), whereas the DSM-CC sections are further packetized to join an MPEG-2 transport stream and sent over a broadcast network or via ATM (Asynchronous Transfer Mode).

At the receiving side, the RTP/RTCP packets in the DSM-CC sections are extracted from the network as well as MPEG-2 data stream and UDP/IP or TCP/IP data in the DSM-CC addressable sections). The RTP/RTCP packets are then presented to the application.

Figure 3:
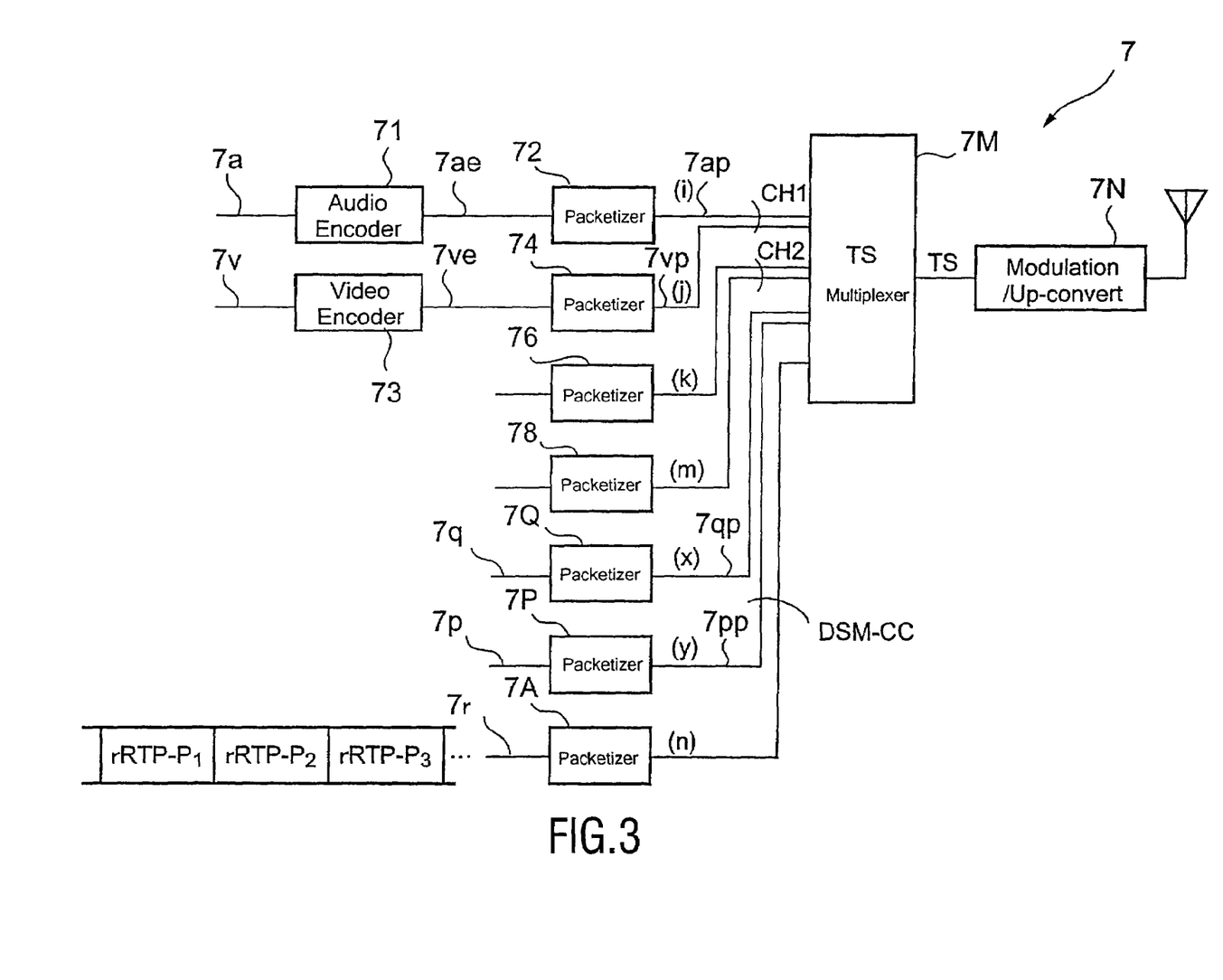
FIG. 3 is a schematic block diagram of a transmitter used in the system of FIG. 1.

FIG. 3 shows a configuration of a transmitter according to one embodiment of the invention.

In this Figure, the transmitter 7 is equipped in the station 2 for example (see FIG. 1), and is arranged to transmit the RTP stream 7r as a target stream compliant with only the Real Time Protocol or its equivalent. The RTP stream 7r has time stamps according to its content in time-axis and other fields including a sequence number.

The transmitter 7 comprises: a module (not shown) for receiving the RTP stream 7r from at least one source, typically encoder, not shown (in the Internet 5 or the content provider 50, or the like); an audio encoder 71 for receiving a plane audio stream 7a from a broadcasting network, e.g. the provider 11 (see FIG. 1) and providing an audio elementary stream 7ae as a kind of broadcasting stream; and a video encoder 73 for receiving a plane video stream 7v from e.g. the same provider 11 and providing a video elementary stream 7ve as another kind of broadcasting stream. The audio elementary stream 7ae and video elementary stream 7ve are both compliant with MPEG-2 standard or its equivalent.

The transmitter 7 further comprises packetizers 72, 74 for packetizing the elementary streams 7ae, 7ve to form the so-called packetized elementary streams (PES) 7ap, 7vp, respectively as compliant MPEG-2 Systems streams. In the Figure, other packetizers 76, 78 may be provided for other elementary streams. Other types of data are also added, such as PSI (Program Service Information)/SI (Service Information) data 7q and a kind of file-form data 7p, respectively based on Service Information and Data Carousel carrying BML files. The data 7p may be audio or video information, but does not pertain to main audio or video e.g., in the stream 7ae, 7ve.

Packets of the RTP stream 7r are supplied to an encapsulating module 7A. The module 7A sectionalizes and encapsulates the RTP stream 7r into a modified form of a stream 7rs of DSM-CC sections of MPEG-2 standard. The form of the RTP stream 7r is illustrated at the lower left side, wherefrom it is seen that the input RTP stream 7r forms a train of raw RTP packets "rRTP-P" with no additional data like a header. The module 7A also makes addition of headers and the like to the rRTP-Ps.

The data 7q is supplied to a packetizer 7Q wherein they are packetized (exactly, sectionalized in a predetermined manner) with a header and some attendant data to make output data 7qp as a compliant MPEG-2 Systems stream for constituting the MPEG-2 compliant stream. The data 7p is also supplied to a packetizer 7P wherein they are packetized (exactly, sectionalized in a predetermined manner) with a header and some attendant data to make output data 7pp as the MPEG-2 compliant MPEG-2 Systems stream. Such manners are well-known, and so their detailed description will be omitted here.

The packetized elementary streams 7ap, 7vp, the other data 7qp, 7pp and the stream 7rs of DSM-CC sections are supplied to a TS (Transport Stream) multiplexer 7M. The multiplexer 7M multiplexes these streams to form a transport stream TS compliant with MPEG-2 or its equivalent. The transport stream TS includes transport stream packets (TS packets) into which the stream of DSM-CC sections and packetized elementary streams, namely, compliant MPEG-2 Systems streams, are divided and encapsulated. The transport stream packets each includes a packet identifier for itself.

Thus obtained transport stream TS is supplied to a module 7N, in which the stream TS is subjected to a predetermined modulation and up-conversion to transmit it at radio frequency to the end user's terminals, e.g. the TV set 40 via the satellite 3 in the broadcasting network (see FIG. 1).

Figure 4:
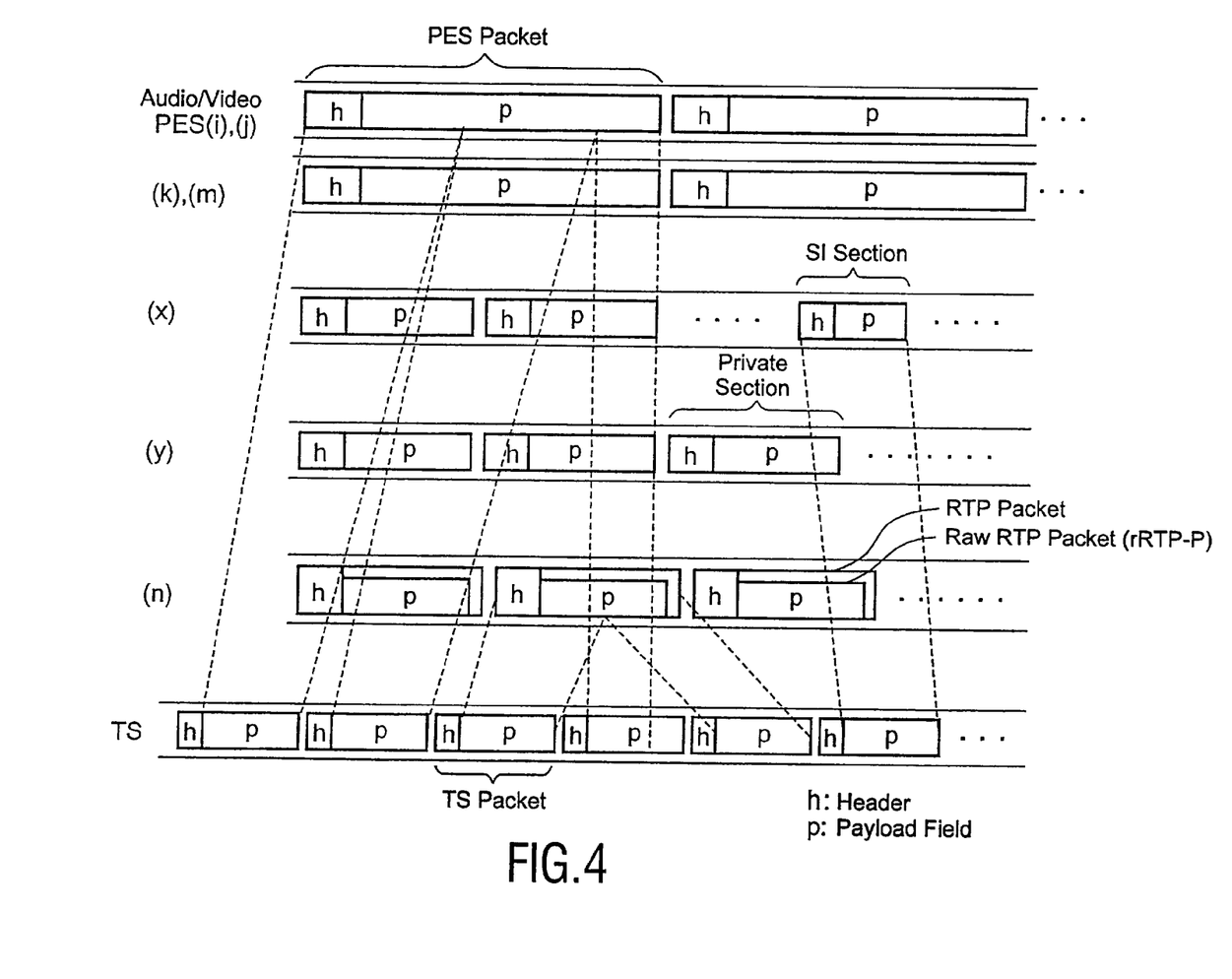
FIG. 4 is a schematic timing chart showing a TS stream.

FIG. 4 shows a relation of the streams, packets and the like that are produced in the transmitter of FIG. 3.

In FIG. 4, the audio/video PES's are shown in the upper section. The PES is constituted by a train of PES packets each including a header "h" and a payload field "p". In this example, the reference numbers (i), (j), (k),(m), etc. correspond to those in FIG. 3, and both audio and video PES's have basically the same format having a sequence of header and payload field.

In the middle section of FIG. 4, there is shown the data 7qp, that is, a stream (x) of Service Information sections and the data 7pp, that is, a stream (y) of private sections based on DSM-CC, and a stream 7rs (n) of RTP packets. The stream (x) is provided for controlling the overall stream. The stream (y) is provided for other data casting streams (Ref. [4]). The streams (i), (j), (k), (m), (x) and (y) pertains to compliant MPEG-2 Systems streams for the broadcasting stream, and the stream 7rs (n) of RTP packets pertains to a target stream to be transmitted based on the direct RTP delivery. The streams (x) and (y) each consists of data sections, the sections each comprising a header and a payload field. The RTP stream (n) is formed by a sequence of RTP packets each including a raw RTP packet (see FIG. 3), a header, a payload field and some attendant data.

In the bottom section of FIG. 4, the transport stream TS of MPEG-2 is shown. The transport stream TS is constituted by a lot of transport stream packets (TS packets). The TS packets each includes a header and a payload field. This payload field is loaded with a peace of data into which the appropriate stream is divided by the multiplexer 7M. The header in the transport stream packet includes a packet identifier, PID having a unique value or number for identifying what kind of stream the packet pertains to. It should be noted that the broken lines are for showing the correspondence of separated pieces of data of the streams with the payloads in the TS but only show one example.

Figure 5:
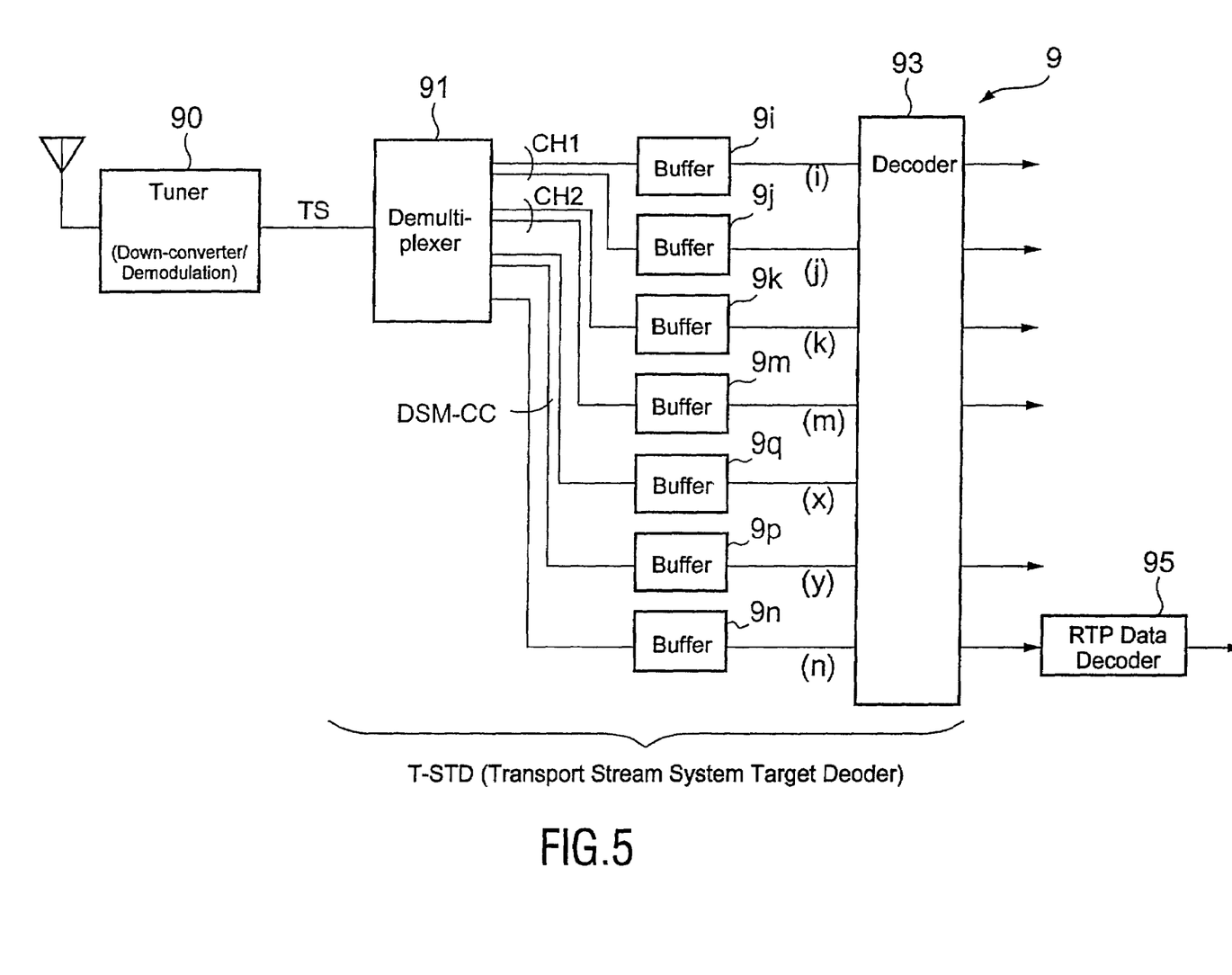
FIG. 5 is a schematic block diagram of a receiver used in the system of FIG. 1.

FIG. 5 shows a configuration of a receiver according to one embodiment of the invention.

In FIG. 5, the receiver 9 is equipped in the TV set 40 or PC 41 for example (see FIG. 1), and is arranged to receive a signal including the transport stream formed by the above-mentioned transmitter system. The receiver 9 comprises a tuner 90 for receiving the signal and deriving the transport stream TS. The tuner 90, in this case, acts as a down-converter and demodulator. The receiver 9 also comprises a demultiplexer 91 for demultiplexing the transport stream TS to derive transport stream packets for the packetized elementary streams 7ap, 7vp, . . . and the RTP stream 7rs using the packet identifier PID.

The receiver 9 further comprises a number of buffers 9i, 9j, 9k, 9m, 9n, 9q, 9p and a decoder 93. The buffers constitute means for combining the transport stream packets into the packetized elementary streams 7ap, 7vp and the RTP stream 7rs. The decoder 93 decodes the packetized elementary streams 7ap, 7vp into the broadcasting streams as audio and video signals in a form of binary stream. The decoder 93 also decodes the RTP stream 7rs into the target stream. The target stream is supplied to an RTP data decoder 95 wherein a plain audio/video signal is reproduced. The demultiplexer 91, buffers and decoder 93 is called T-STD (Transport stream System Target Decoder). The buffers 9q, 9p are for the data 7qp, 7pp, outputs of which are supplied to the decoder 93. The decoder 93 performs decoding operations in accordance with the output of buffer 9q that is the PSI/SI information of (x) so as to certainly decode the other buffer outputs.

Since the demultiplexer performs its demultiplexing by using the PID, the transport stream packets for the RTP stream can be properly separated from the transport stream TS.

Next, it will be described in more detail how the encapsulation of RTP and RTCP packets in DSM-CC is implemented.

Figure 6:
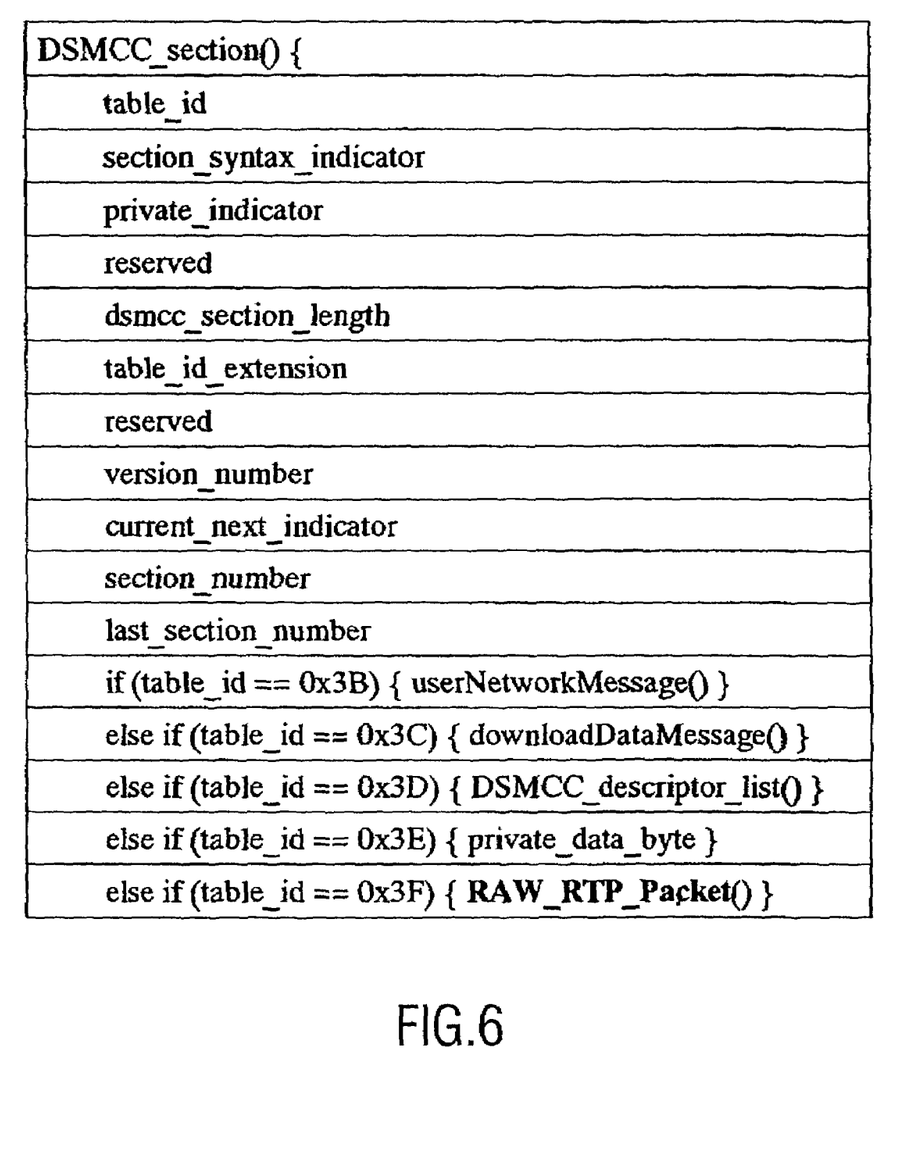
FIG. 6 is a diagram showing the modification of DSM-CC message to include RTP payload and specific signaling.

The raw RTP packets produced by an encoder on the provider side and to be sent over MPEG2 network are encapsulated in a modified form of ARIB DSM-CC sections. The modification of DSM-CC message to include RTP payload and specific signaling is shown in FIG. 6. In FIG. 6, the payload date "RAW_RTP_Packet( )" consists only of the raw RTP packet as it is produced by the encoder. Important RTP packet header data are repeated in the DSM-CC section header for the sake of efficient parsing. The details are shown below.

Figure 7:
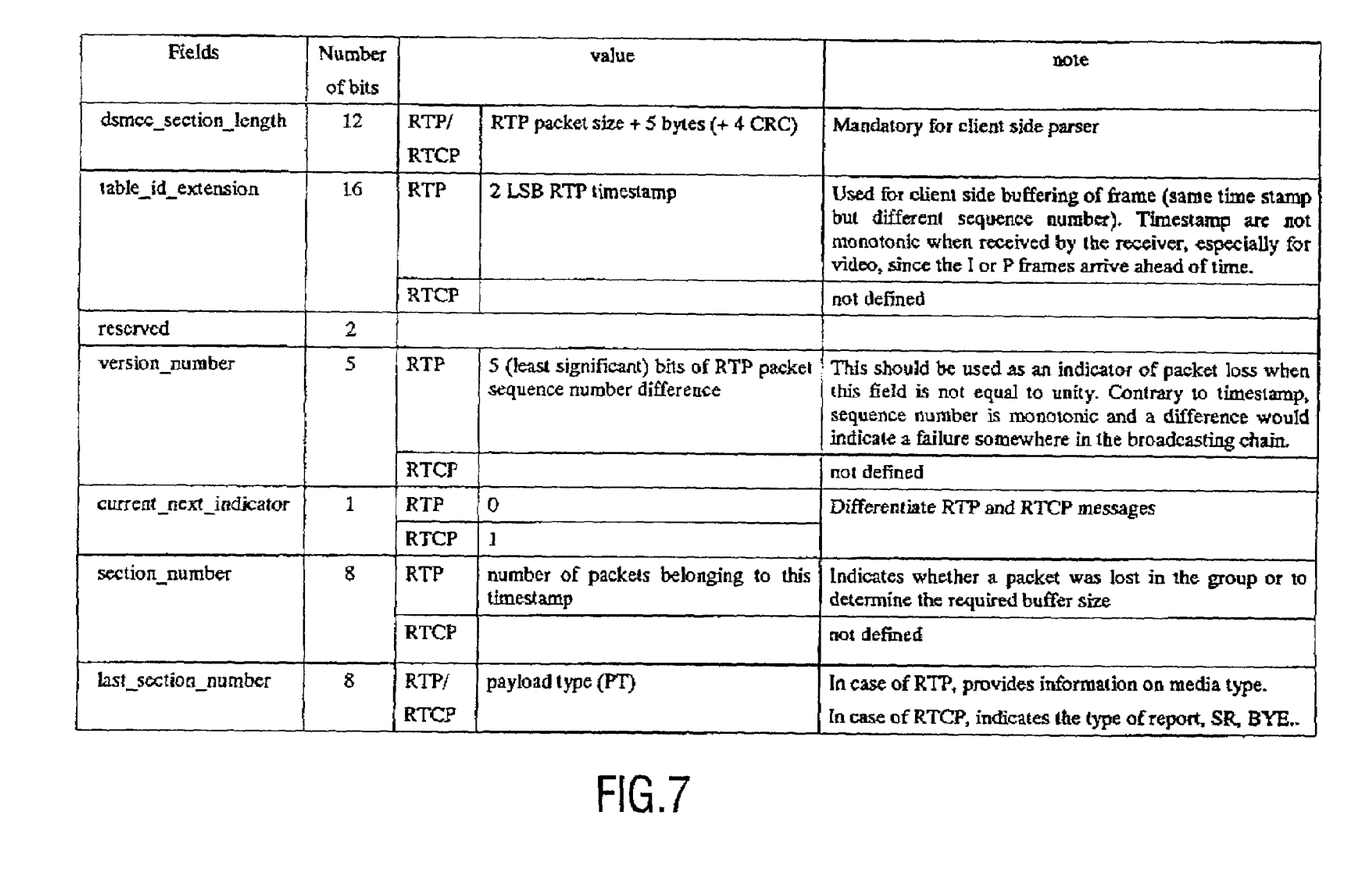
FIG. 7 is a table showing use of the DSM-CC section header fields for carrying RTP packets.

The final usage of the different fields appearing in the section header should be decided inside a standardization group based on experiments, as is usual in Internet RFC draft process or ARIB or DVB groups for example. In FIG. 7, we provide a possible implementation as was tested in our experimental setup (see below). Although, we could use a complete new proprietary section format (table_id=0×3E), we have kept the same form as the existing ARIB section because some hardware demultiplexers apply filtering down to a dozen of bytes in depth, so that legacy device can be used as well.

RTCP control message packets are used to provide feedback on the quality of the data distribution. They are usually multiplexed with raw RTP packets on the same transport channel, for example, over UDP/IP with a port number increased by one and an identical IP address. Another purpose of RTCP is to keep track of a persistent transport-level identifier of the RTP source, using the CNAME. In this framework, the usage of RTCP reports is by construction different. However, it is recommended to send at least Sender Report (SR) messages encapsulated using DSM-CC table with table_id=0×3f and "BYE".

Figure 8:
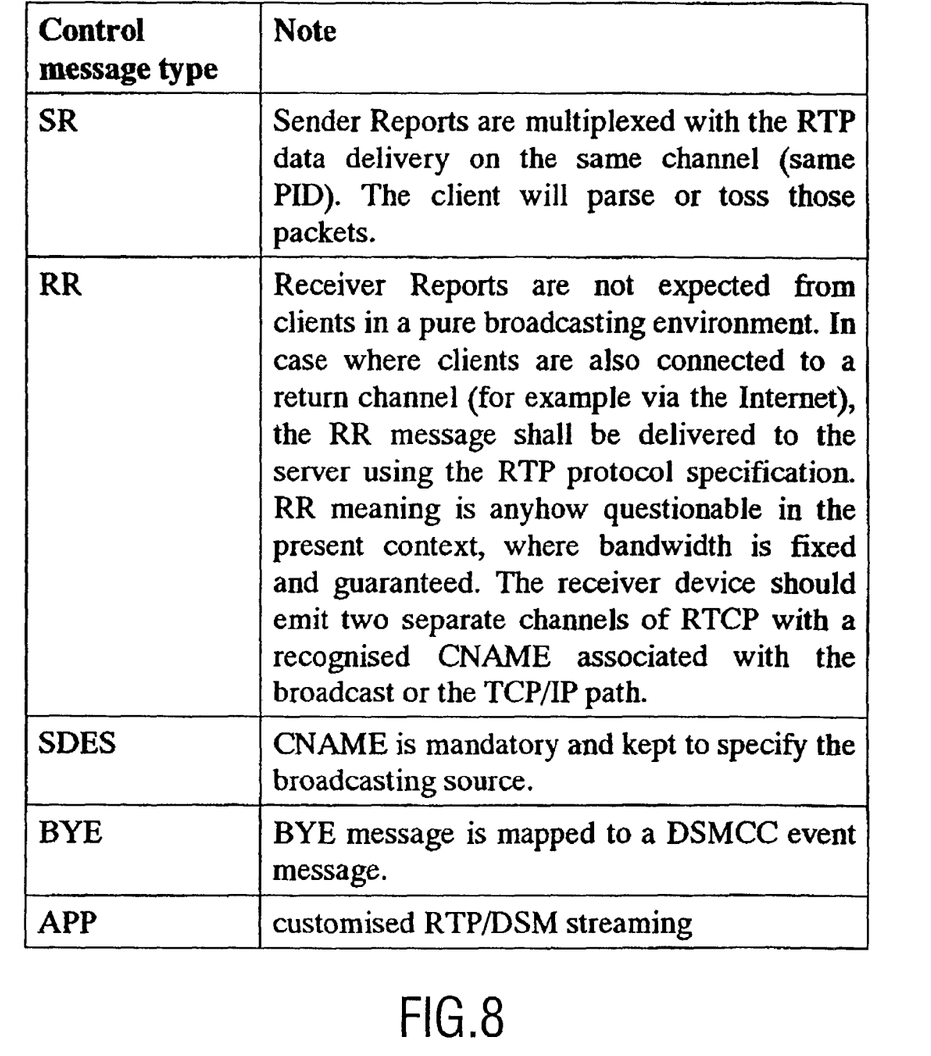
FIG. 8 is a table showing one example of use of RTCP control messages.

FIG. 8 shows one example of use of RTCP control messages.

In RTP/UDP/IP delivery framework, the multiplexing of RTP sessions is handled by the (network address, port) pair. In the MPEG2 system framework, the session is identified by the (component_tag, PID) pair as described below. It is the responsibility of the broadcast system 2 (FIG. 1) to map the network/port to component_tag/PID.

The current framework is not intended to broadcast high bit rate media, such as high-definition MPEG2-video since conventional methods would do a much better job. The target is more Internet streaming content, such as real audio/video, MPEG-4 etc . . . produced my low to mid size producers. The expected bit rates range from few dozen to several hundreds Kbytes/s.

Figure 9:
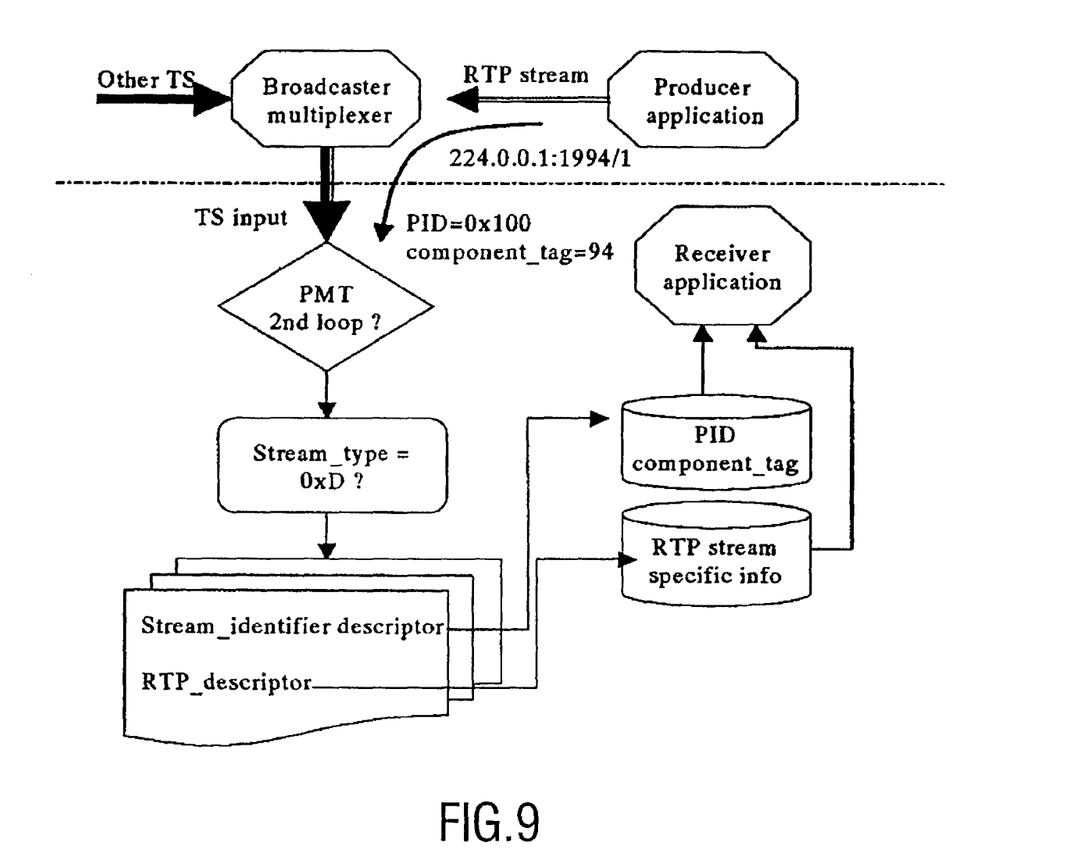
FIG. 9 is a block diagram representing access of RTP/DSM-CC stream from Service Information.

In UDP/IP based delivery scheme, a section would be identified by the (network address, port number). In broadcasting terms, this information has to be mapped to MPEG-2 System descriptor format. First, the RTP stream, once encapsulated in DSM-CC sections will be packetized in TS packets and a PID will be assigned to them. The way the receiving application can associate the PID to the RTP stream is achieved by extended the Service Information's Program Map Table. The receiver would monitor the PMT and determine, first if a data broadcasting channel is currently available (stream_type=0×D), then parse the descriptors and extract the component_tag/PID and RTP specific information carried in the newly defined RTP_descriptor. This process is summarized on FIG. 9. As an example, the video on PID 0×100 and component_tag=94, the audio on PID 0×101 and component_tag=95, etc., would correspond to an original RTP stream like rtp://224.0.0.1:1994/video/1 and rtp://224.0.0.2:1994/audio/1.

The Real Time Streaming Protocol (RTSP) is an application-level protocol intended to provide control over real-time media for on-demand video for example. In the context of digital broadcasting, it will be useful to transmit at least a sub-set of the messages originating from a producer. This can be seen as a similar process as an HTTP based push model. The initial connection is virtually open and the server sends the RTSP messages over the broadcasting channel as if it was a regular connection. The advantage is that, an application, which is built on RTSP/RTP for streaming on the Internet, could still work, providing some limited modifications, by hooking to the broadcast channel. On the other hand, an application initially built for the ARIB environment, say a BML browser, could use these messages to trigger the launch of a session. Therefore, we propose to map the required RTSP messages onto data broadcasting event messages such as those found in ARIB DSM-CC standard. The necessary information from RTSP server to be carried through DSM-CC messages down to the client is mainly the sessions status, parameters, and duration. For example, it would be useful to transmit the RTSP ANNOUNCE messages if there is any broadcast by the server.

In ARIB BS-Digital, multimedia presentations are encoded in BML format (XML based) and the data sent over the MPEG-2 System stream using DSM-CC data carousel. We propose to define a new data source format to support delivery of RTP packets over DSM-CC. We define the data source format as:

rtpdsm://[ . . . ]/component_tag/

The [ . . . ] represents extra information found in the ARIB name space. As an example, taking an RTP stream broadcast on PID 0×100 and 0×101, with component_tag=94 and 95 respectively the BML code would look like:

<div style="width:960px; height:540px; left:0px; top:0px; background-color-index:8;">
  <object id="Vstream" type="video/x-arib-mpeg4" data="rtpdsm://94"
  remain="remain" style="left:543px; top:30px; width: 360px; height:202px"/>
<object id="Astream" type="audio/x-arib-mpeg4" data="rtpdsm://95" remain="remain"
  streamstatus="play"/>
</div>

In the BML context, the aforementioned RTSP to event mapping could be used in the following way:
<bevent>
<beitem id="RTSPmessage" type="ANNOUNCE"
subscribe="subscribe"
onoccur="ProcessRTSPAnnounceMessage( );"/>
</bevent>

The ProcessRTSPAnnounceMessage( ) function could be a call to a downloaded agent (java class) that would handle the RTSP message properly in the context of the receiver and perform the required response to the server if a return channel is available.

REFERENCE NUMERALS:

1 broadcasting system
10, 11 TV-program provider
1r, 2r RTP data
2 broadcasting station
3 broadcasting satellite
4 consumer's home
40 TV set
41 personal computer
5 the Internet
50 content provider
7 transmitter
7a plane audio stream
7v plane video stream
7ae audio elementary stream
7ve video elementary stream
7ap audio packetized elementary stream
7vp video packetized elementary stream
7q PSI/SI data
7p a kind of file-form data 71 audio encoder
72, 74, 76, 78 packetizer
7Q, 7P packetizer
7A encapsulation module
73 video encoder
7M multiplexer
7N modulation/up-converting module
90 tuner
91 demultiplexer
9i, 9j, 9k, 9m, 9n, 9q, 9p buffer
93 decoder
95 RTP data decoder

The invention claimed is:

1. A method of transmitting a target stream compliant with the Real Time Protocol, the target stream having time stamps according to its content, the method comprising the steps of:
   receiving the target stream from at least one source and receiving a broadcasting stream from a broadcasting network, the broadcasting stream being compliant with the MPEG-2 standard;
   packetizing or sectionalizing the broadcasting stream to form a compliant MPEG-2 Systems stream;
   encapsulating the target stream in a stream of DSM-CC sections; and
   multiplexing the stream of DSM-CC sections and the compliant MPEG-2 Systems stream to form a transport stream compliant with MPEG-2, the transport stream including transport stream packets into which the stream of DSM-CC sections and compliant MPEG-2 Systems stream are divided and encapsulated, the transport stream packets each including a packet identifier for itself.

2. A method as claimed in claim 1, characterized in that the method further comprises the step of transmitting the transport stream to end user's terminals in the broadcasting network.

3. A method as claimed in claim 1, characterized in that the target stream is an RTP stream originated in the Internet.

4. A method as claimed in claim 3, characterized in that the RTP stream is for representing audio or video.

5. A method as claimed in claim 1, characterized in that the broadcasting stream includes a stream for representing audio or video for broadcasting.

6. A method of receiving a signal including the transport stream formed by the method as claimed in claim 1, the method comprising the steps of:
   receiving the signal and deriving the transport stream;
   demultiplexing the transport stream to derive transport stream packets of the compliant MPEG-2 Systems stream and the stream of DSM-CC sections, using the packet identifiers for the streams;
   combining the transport stream packets into the compliant MPEG-2 Systems stream and the stream of DSM-CC sections;
   decoding the compliant MPEG-2 Systems stream into the broadcasting stream; and
   decoding the stream of DSM-CC sections into the target stream.

7. A system f or transmitting a target stream compliant with the Real Time Protocol, the target stream having time stamps according to its content, the system comprising:
   means for receiving the target stream from at least one source and for receiving a broadcasting stream from a broadcasting network, the broadcasting stream being compliant with the MPEG-2 standard;
   means for packetizing or sectionalizing the broadcasting stream to form a compliant MPEG-2 Systems stream;
   encapsulating the target stream in a stream of DSM-CC sections; and
   means for multiplexing the stream of DSM-CC sections and the compliant MPEG-2 Systems stream to form a transport stream compliant with MPEG-2, the transport stream including transport stream packets into which the stream of DSM-CC sections and compliant MPEG-2 Systems stream are divided and encapsulated, the transport stream packets each including a packet identifier for itself.

8. A system for receiving a signal including the transport stream formed by the system as claimed in claim 7, the system comprising:
   means for receiving the signal and deriving the transport stream;
   means for demultiplexing the transport stream to derive transport stream packets of the compliant MPEG-2 Systems stream and the stream of DSM-CC sections, using the packet identifiers for the streams;
   means for combining the transport stream packets into the compliant MPEG-2 Systems stream and the stream of DSM-CC sections;
   means for decoding the compliant MPEG-2 Systems stream into the broadcasting stream; and
   means for decoding the stream of DSM-CC sections into the target stream.

* * * * *